Figure 1:
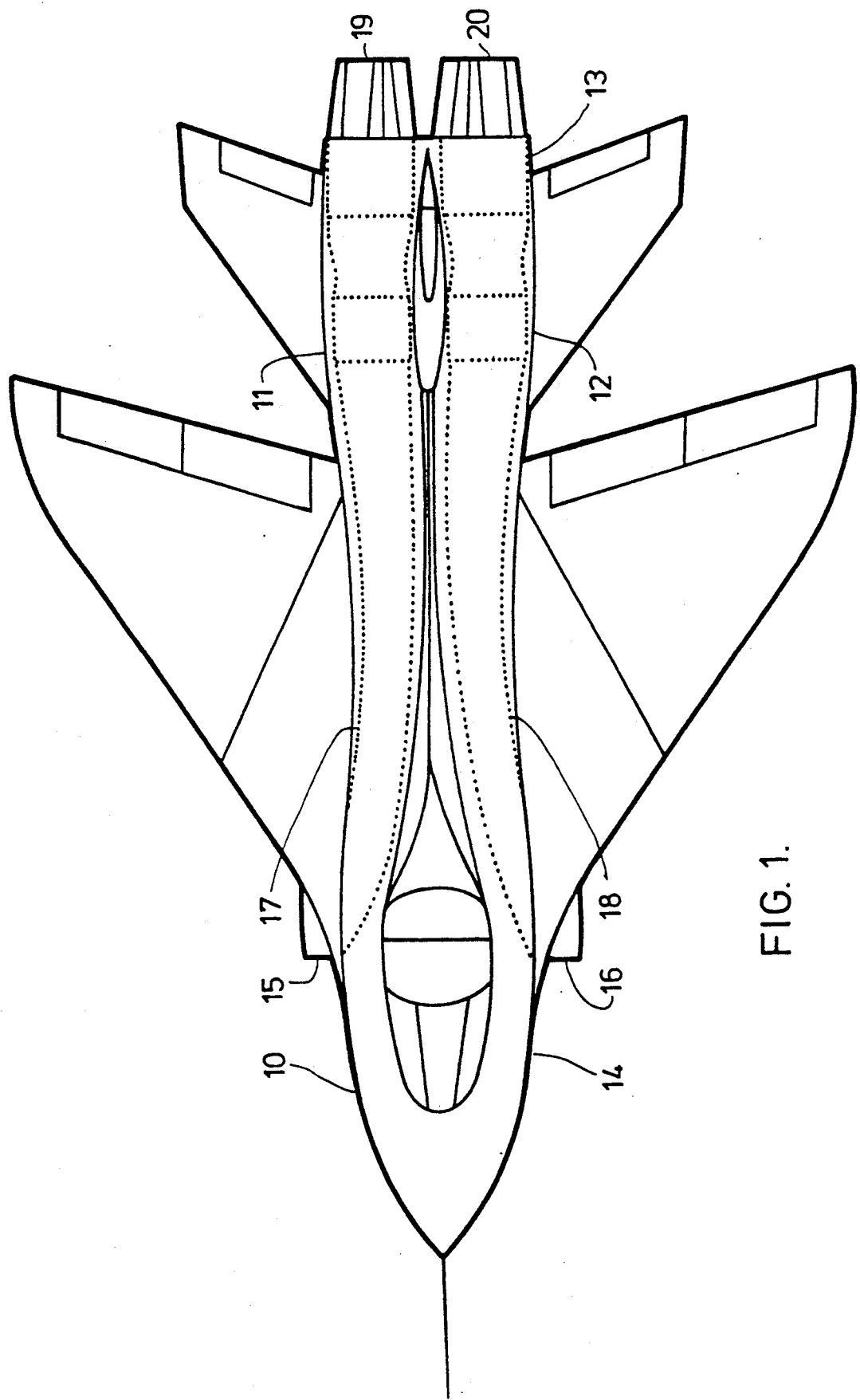

United States Patent [19]

Nightingale

[11] Patent Number: 5,110,050
[45] Date of Patent: May 5, 1992

[54] GAS TURBINE ENGINE NOZZLE

[75] Inventor: Douglas J. Nightingale, Bristol, England

[73] Assignee: Rolls-Royce (1971) Limited, London, England

[21] Appl. No.: 22,273

[22] Filed: Feb. 15, 1979

Related U.S. Application Data

[63] Continuation of Ser. No. 833,221, Sep. 14, 1977, abandoned, which is a continuation of Ser. No. 610,189, Sep. 3, 1975, abandoned.

[30] Foreign Application Priority Data

Sep. 7, 1974 [GB] United Kingdom .................... 39182

[51] Int. Cl.⁵ .............................................. F02K 1/12
[52] U.S. Cl. ............................... 239/265.39; 60/271; 239/265.43
[58] Field of Search .................. 60/271; 239/265.33, 239/265.37, 265.39, 265.41, 265.43

[56] References Cited

U.S. PATENT DOCUMENTS

| | | |
|---|---|---|
| 2,796,731 | 6/1957 | Morley et al. ................ 239/265.39 |
| 2,801,516 | 8/1957 | Battle et al. .................... 239/265.39 |
| 3,892,358 | 7/1975 | Gisslen .......................... 239/265.43 |

FOREIGN PATENT DOCUMENTS

| | | |
|---|---|---|
| 742875 | 6/1956 | United Kingdom . |
| 868868 | 5/1961 | United Kingdom . |
| 918018 | 2/1963 | United Kingdom . |
| 951130 | 3/1964 | United Kingdom . |
| 1116542 | 6/1968 | United Kingdom . |

Primary Examiner—Stephen C. Bentley
Attorney, Agent, or Firm—Oliff & Berridge

[57] ABSTRACT

A variable geometry nozzle for a gas turbine engine in which a circumferential array of flaps are pivotally connected to the engine by their upstream ends, the flaps comprising interdigitated flexible and rigid flaps. The geometry of the nozzle is varied by drawing together the side edges of adjacent flexible flaps which causes pivoting of both the rigid and flexible flaps and a change in the curvature of the flexible flaps. The rigid flaps seal the spaces between the side edges of adjacent flexible flaps. A modification is shown using auxiliary radially outwardly flared flaps to provide convergent divergent geometry.

15 Claims, 9 Drawing Sheets

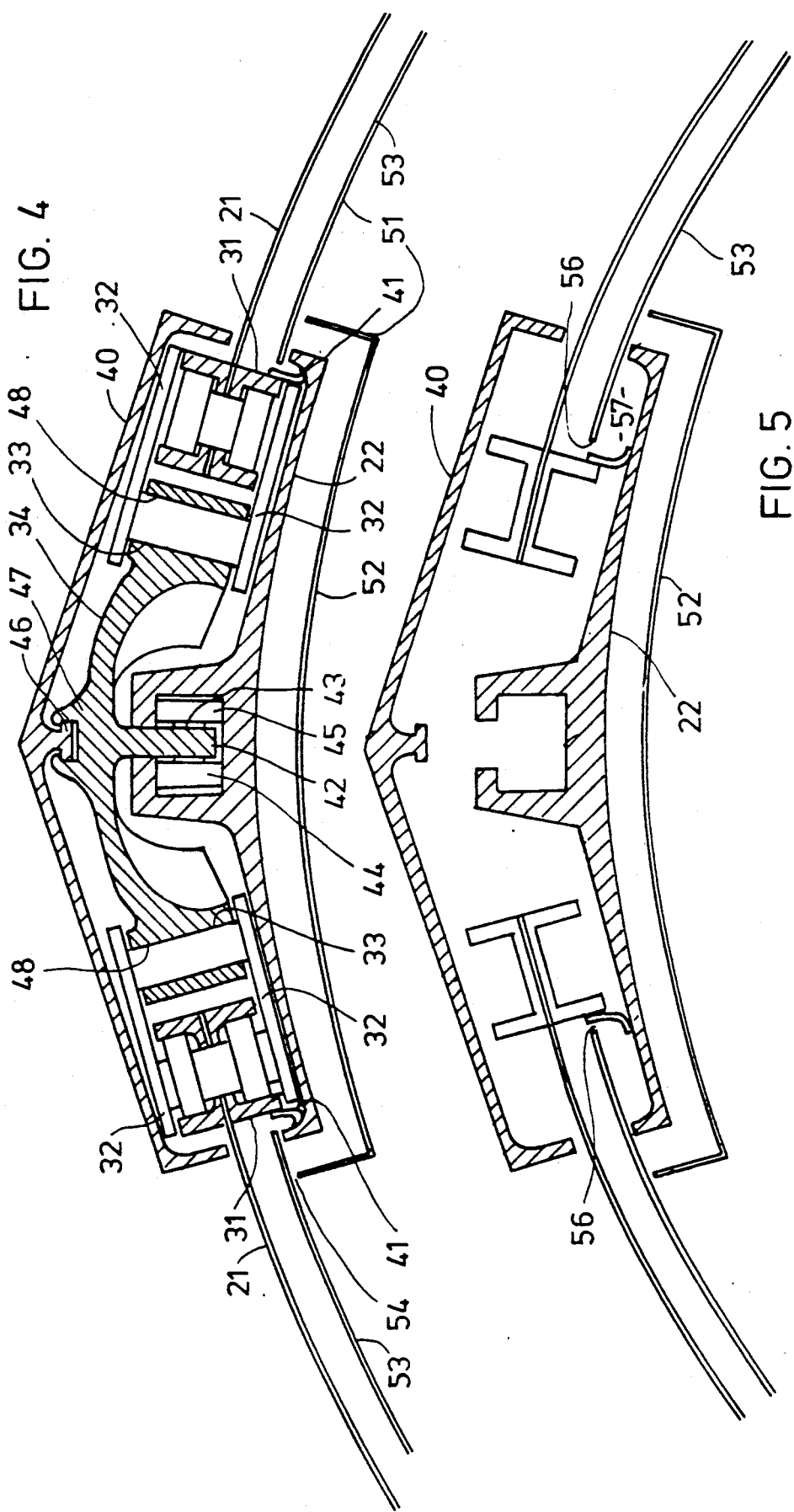

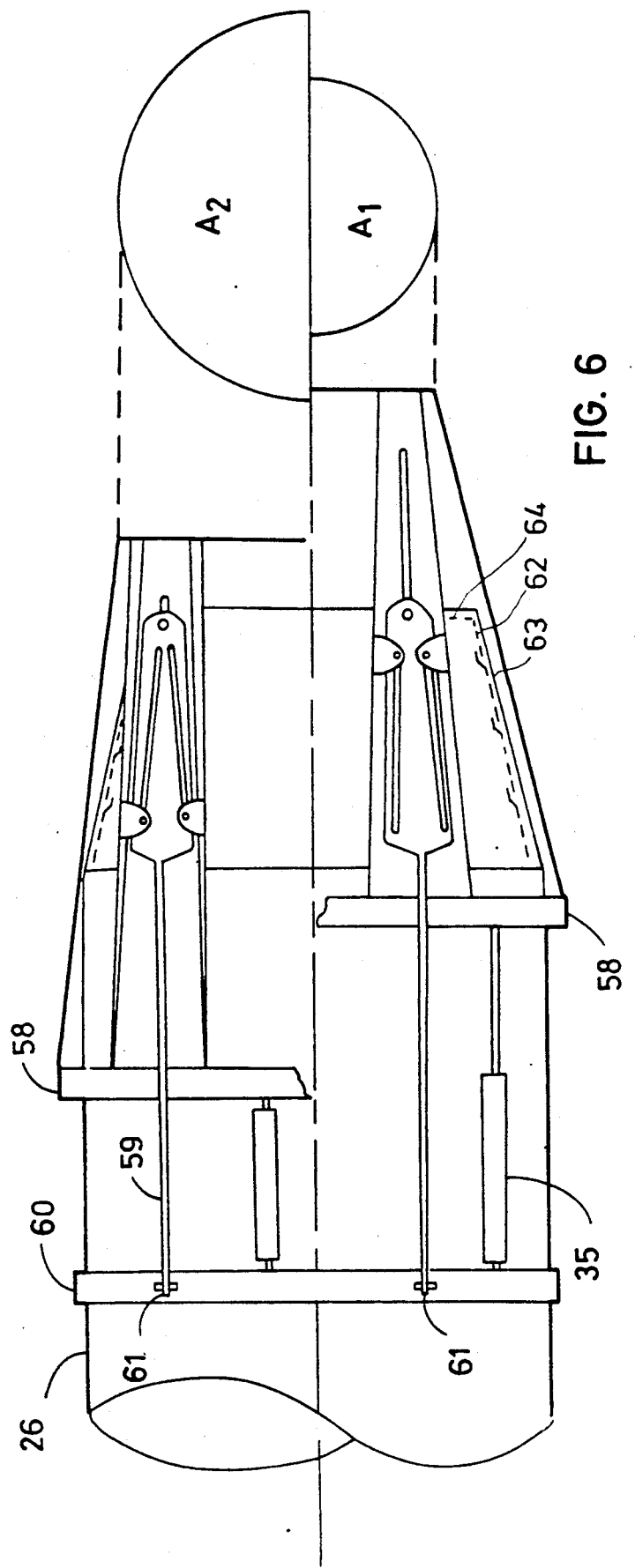

GAS TURBINE ENGINE NOZZLE

This is a continuation of application Ser. No. 833,221 filed Sep. 14, 1977, now abandoned, which was a continuation of application Ser. No. 610,189, filed Sep. 3, 1975, now abandoned.

The present invention relates to improvements in gas turbine engines and has particular reference to a variable geometry nozzle therefore.

Variable geometry nozzles for gas turbine engines comprise exit nozzles of varying convergence, and those whose geometry can change from convergent to convergent-divergent in which a nozzle throat is formed upstream of the final discharge opening of the nozzle. The use of convergent nozzles is restricted mainly to sub-sonic flight conditions of an aircraft in which the engine is installed, while nozzles whose geometry can change from convergent to convergent-divergent are more particularly adapted to supersonic flight regimes.

Hitherto variable geometry nozzles for gas turbine engines installed in aircraft have been proposed which are capable of significantly reducing the base drag incurred by the nozzle at cruise conditions of the aircraft, when the nozzle outlet area is generally at a minimum. However, it is frequently desired to mount gas turbine engines in pairs, for example in the side by side installation favored in some fighter aircraft, and for such installations it is particularly important to be able to mount the engines as close together as possible in order to reduce the area of the base between them. The closeness with which two engines may be mounted together is generally determined by the space required to accommodate both nozzles in their maximum area position and by the space required to house the nozzle area varying mechanism. Thus while for an individual engine the base drag incurred by the nozzle at cruise conditions may be significantly reduced, a problem can still arise when two such engines are mounted together because of the space required for the nozzle geometry varying mechanism.

Further problems exist with variable geometry nozzles inasmuch as it is desirable to reduce the weight of variable geometry nozzles simultaneously with reducing the base drag of the nozzle.

The present invention seeks to overcome the above mentioned problems by providing a variable geometry nozzle of relatively lightweight construction, for which the base drag is relatively low at all operating conditions of the nozzle and which furthermore is suitable for installation side by side with a second similar variable geometry nozzle.

According to the present invention there is provided a gas turbine engine having a nozzle wherein a plurality of flaps are pivotable about their upstream ends and co-operate to vary the geometry of the nozzle, the flaps comprising at least three relatively flexible flaps interdigitated with relatively rigid flaps, the axially extending side edges of respective adjacent relatively flexible flaps being connected together by means capable of varying the distance between said side edges whereby all the flaps pivot about their upstream ends and the flexible flaps are caused to change their curvature so that the geometry of the nozzle is varied.

The relatively rigid flaps may be conveniently connected to the means capable of varying the distance between adjacent side edges to ensure that they move together with the relatively flexible flaps.

In one embodiment of the invention the flaps are pivoted at their upstream ends to a ring surrounding the jet pipe of a gas turbine engine, the ring being axially movable relative to the jet pipe so that means fixed to the jet pipe co-operate with the flaps on said movement of the ring to vary the distance between the side edges of the respective adjacent relatively flexible flaps.

In a further embodiment of the invention there is provided in respect of each relatively rigid flap an axially extending radially outwardly flared extension connected to the rigid flap and in respect of each relatively flexible flap at least one radially outwardly flared flap portion disposed downstream of the end of that flexible flap, and supported by a respective beam overlying the flexible flap, the outwardly flared extensions and the outwardly flared flap portions being interdigitated and there being provided means for controlling the radially outward pivotal movement of the outwardly flared flap portions to correspond with radial outward pivotal movement of the relatively rigid flap on operation of the nozzle.

Preferably the beams which support the outwardly flared flaps are pivotally connected at their upstream ends to the same structure as the rigid and flexible flaps.

The movement of the outwardly flared flaps may be limited by means of rollers attached to the beams and which run on the radially inner surfaces of curved tracks disposed adjacent the rollers.

Further interdigitated flaps well known per se as fairing flaps may be provided to blend the nozzle exit with fixed structure upstream of the nozzle.

Figure 2:
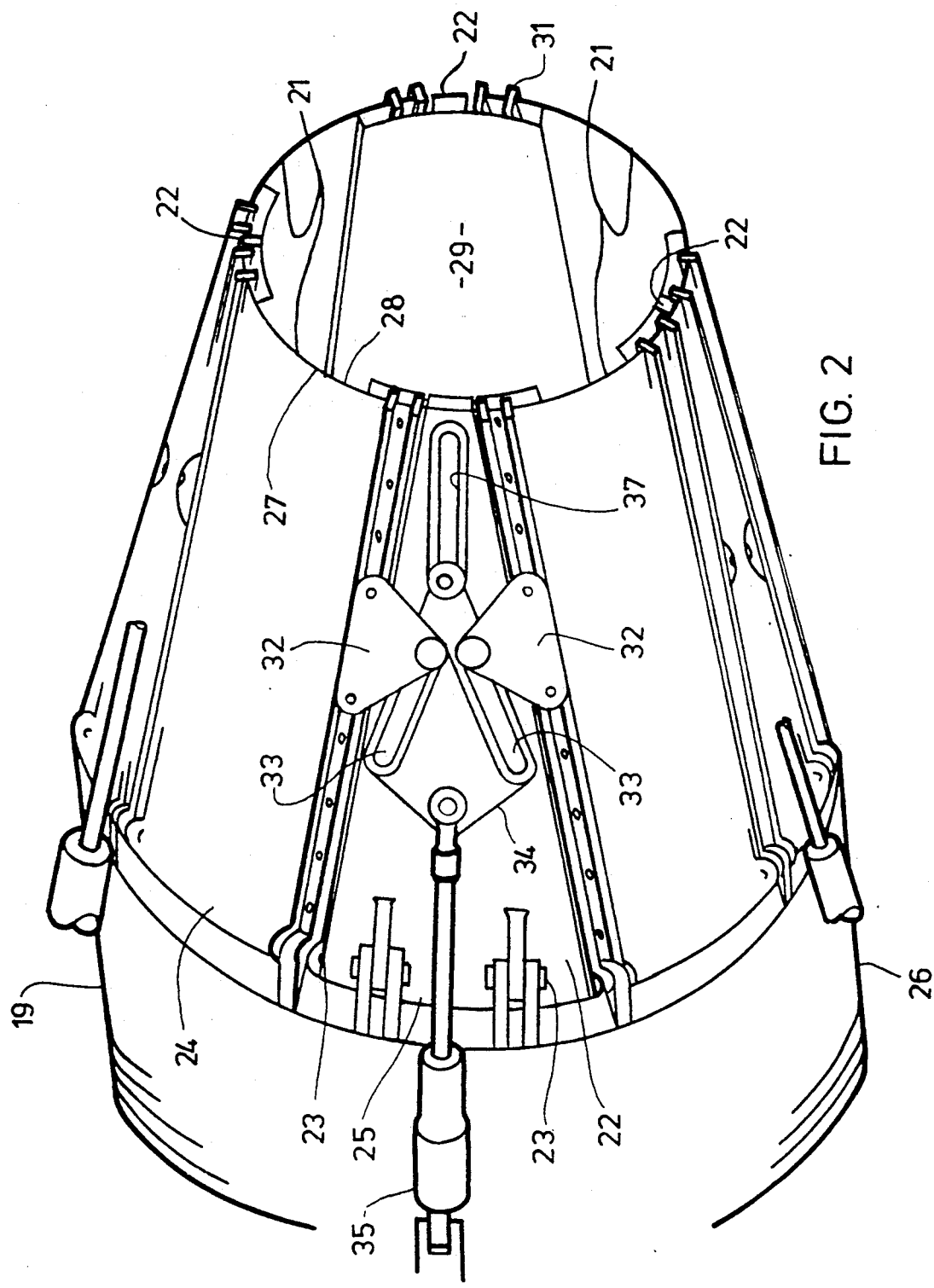
Figure 3:
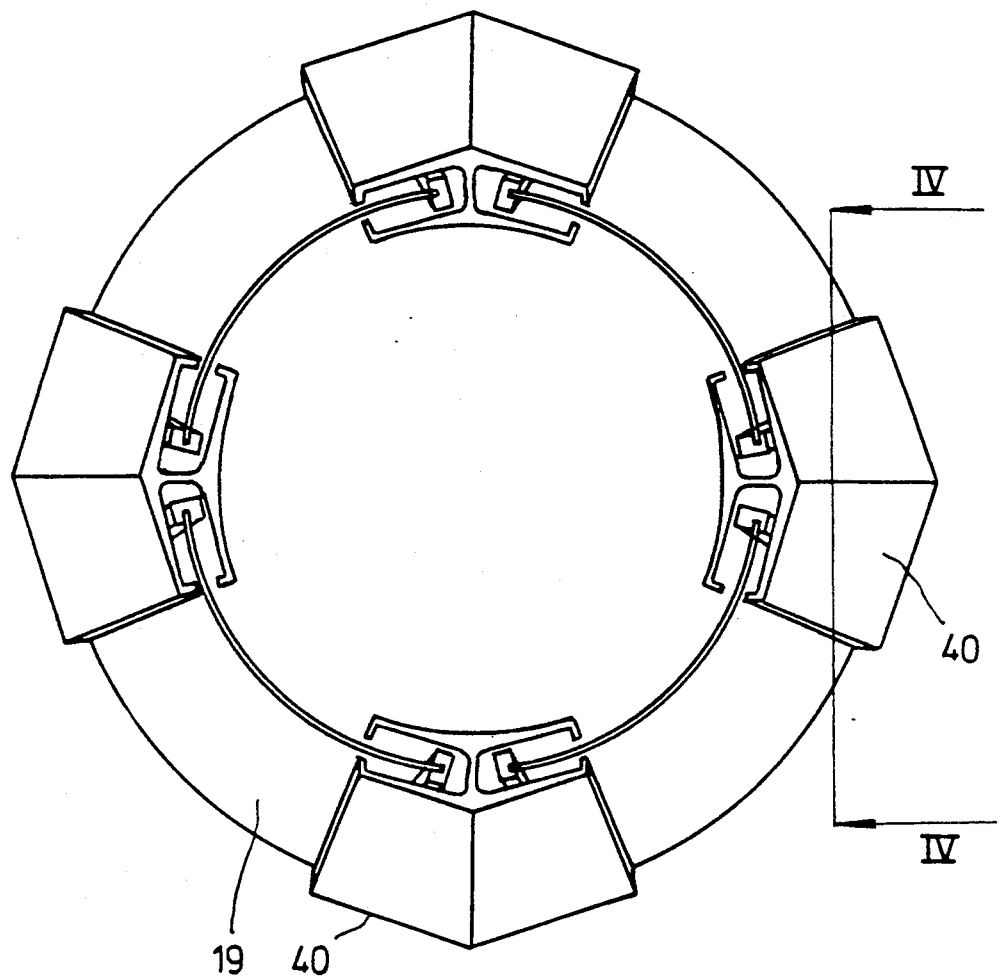
Figure 7:
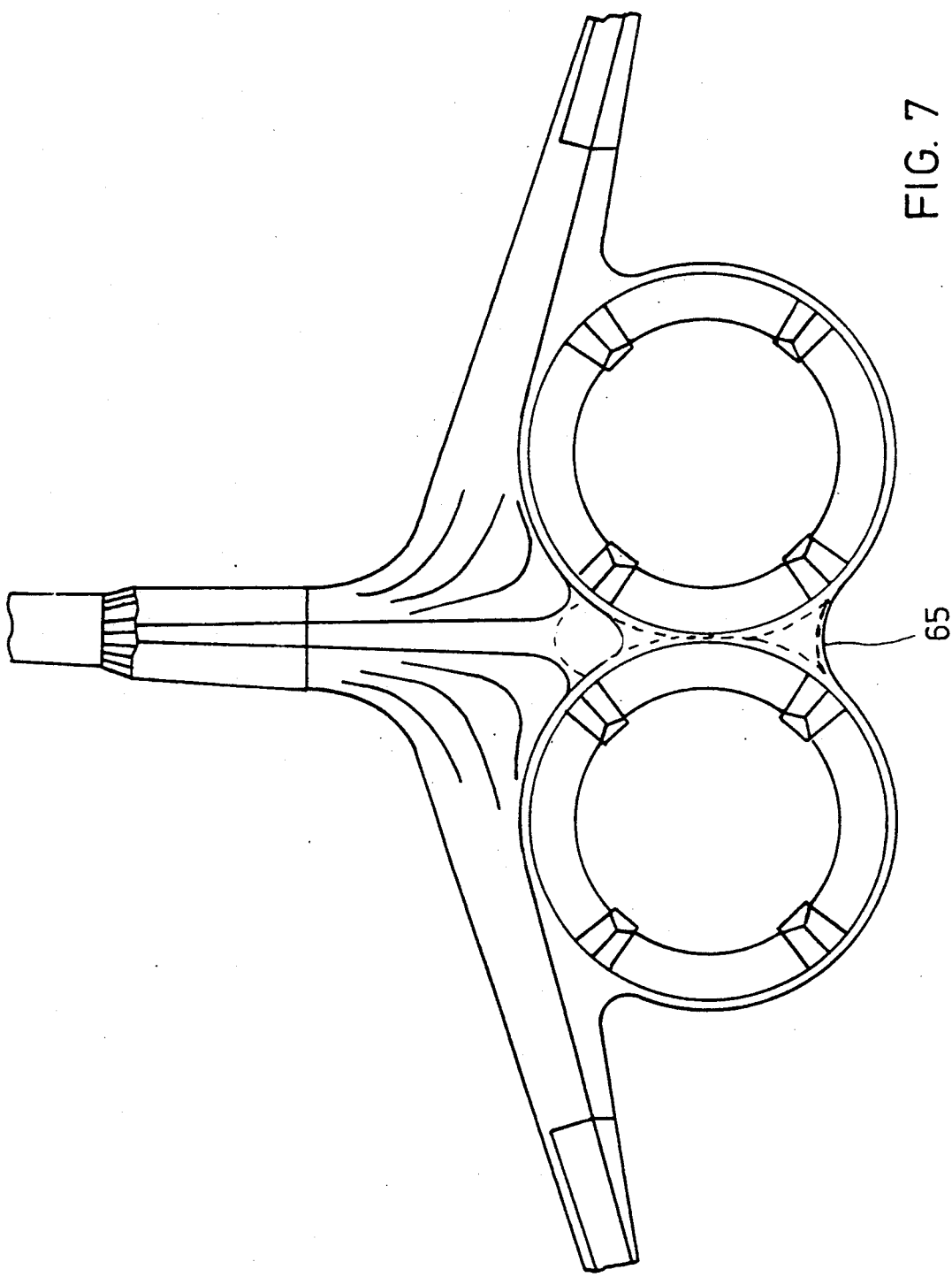
Figure 8:
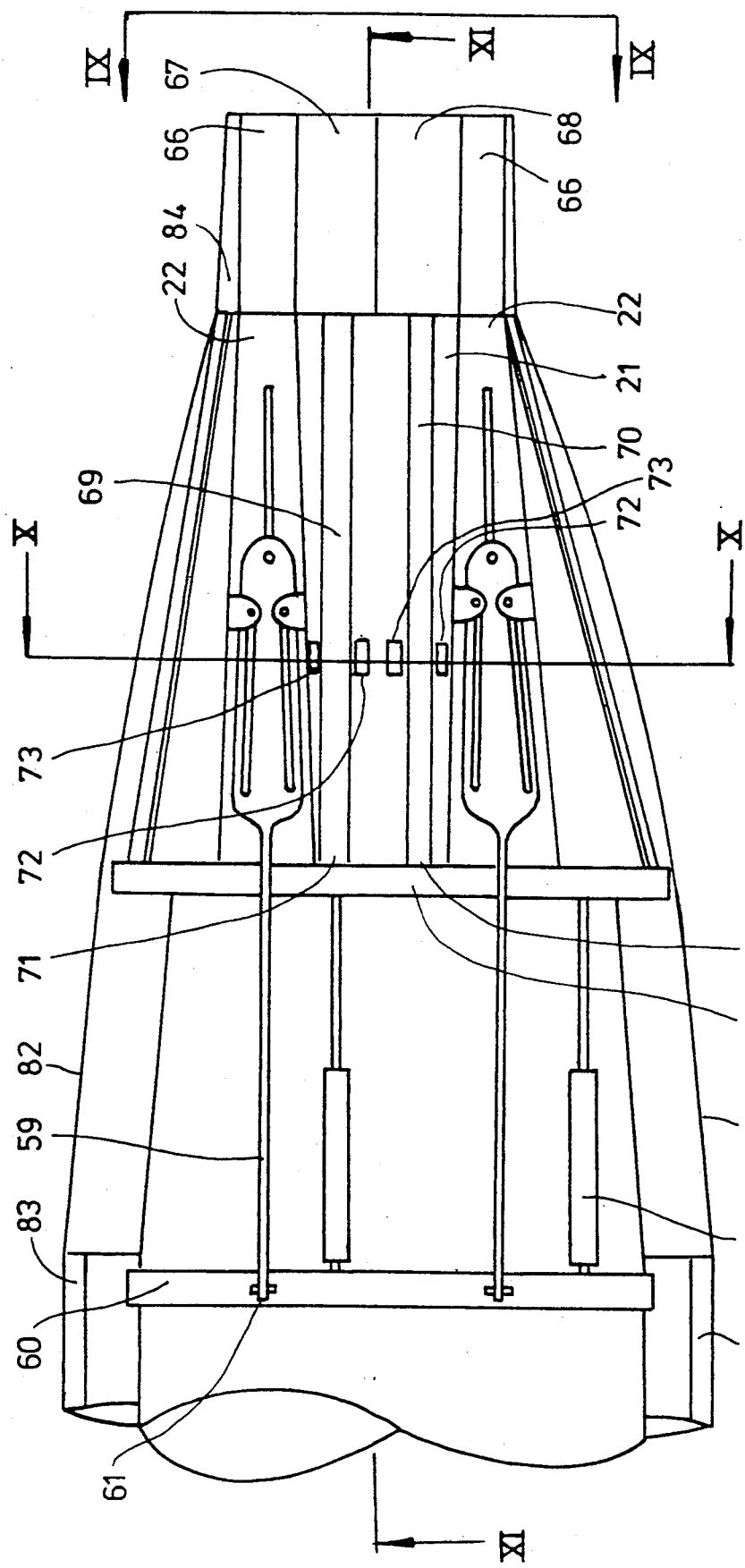
Figure 10:
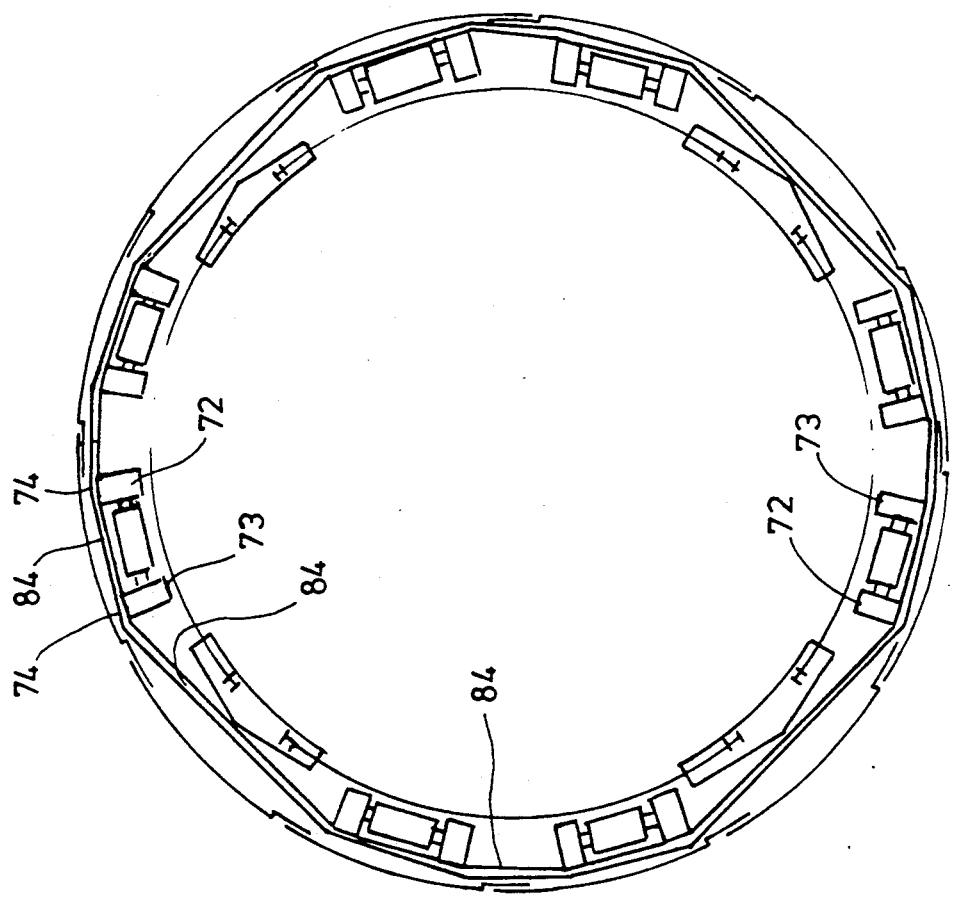
Figure 9:
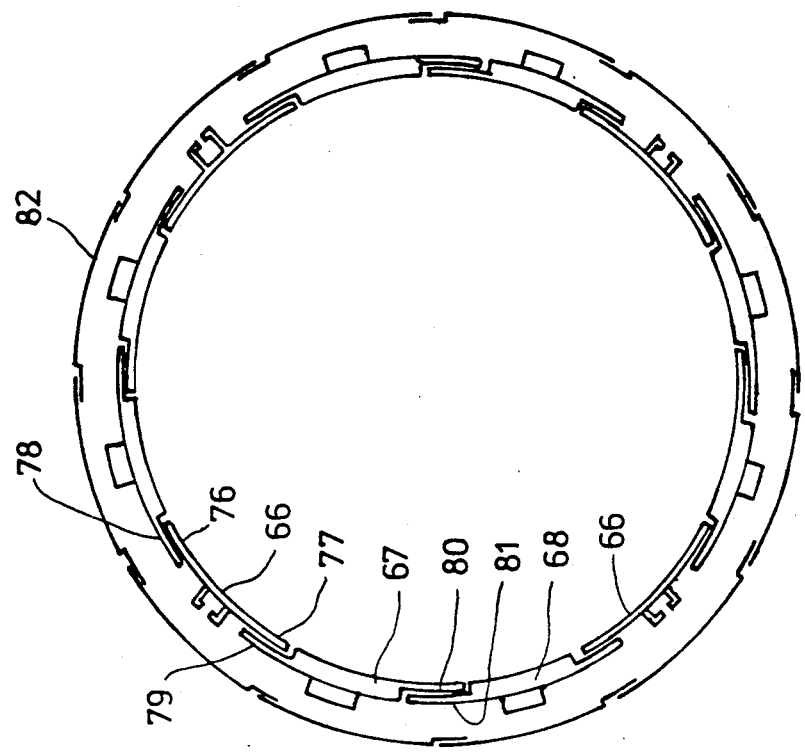
Figure 11:
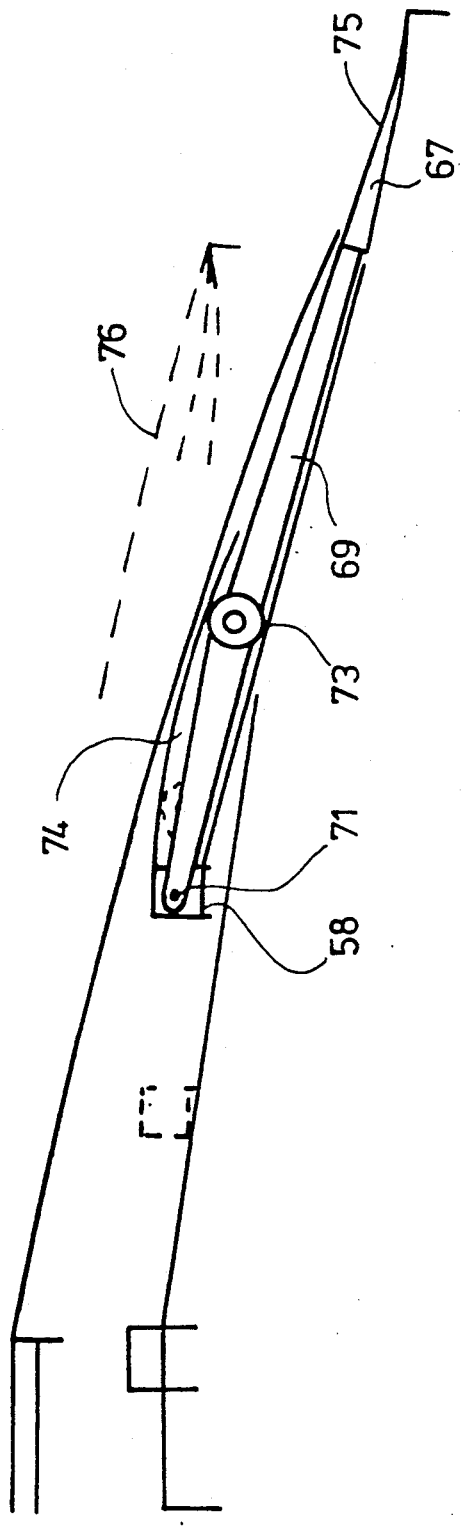

Specific embodiments of the invention will now be described by way of example only and with reference to the accompanying drawings wherein, FIG. 1 is a plan view of an aircraft, FIG. 2 is a perspective view of a nozzle for the gas turbine engines of the aircraft of FIG. 1, FIG. 3 is an axial view of the downstream end of the nozzle of FIG. 2, FIG. 4 is a detail view of the operating mechanism of the nozzle of FIG. 2 taken on the line IV—IV with the nozzle in the maximum area position, FIG. 5 is a similar view to that of FIG. 4 with the nozzle in the minimum area position, FIG. 6 shows an alternative means of operating the nozzle of FIGS. 2 to 4, FIG. 7 is a view of the aircraft of FIG. 1 as seen from the rear, FIG. 8 is a side elevation of an alternative construction showing a convergent divergent nozzle, FIG. 9 is an end elevation of the nozzle of FIG. 8 as seen on the line IX—IX to an enlarged scale, FIG. 10 is a section of the nozzle of FIG. 8 as seen on the line X—X to an enlarged scale, FIG. 11 is a longitudinal half section through the nozzle of FIG. 8 as seen on the line XI—XI.

Referring now to FIG. 1 there is shown an aircraft 10 having two engines 11, 12 installed side by side at the aft end 13 of the fuselage 14. Each engine is arranged to accept air from respective inlets 15, 16 via ducts 17, 18 and to discharge a propulsive stream via respective variable geometry nozzles 19 and 20, which in this embodiment are of variable convergence.

Turning now to FIG. 2 the variable nozzle 19, which is substantially identical to the variable nozzle 20, is shown in more detail. The nozzle 19 comprises four relatively flexible flaps 21 interdigitated with four relatively rigid flaps 22. Both the relatively flexible flaps 21 and the relatively rigid flaps 22 are pivotally connected by respective hinges 23 at their upstream ends 24, 25 to the jet pipe 26 of the gas turbine engine. At their respective downstream ends 27, 28 the relatively flexible flaps 21 and the relatively rigid flaps 22 flaps together define a discharge opening 29. At the axially extending side edges of each of the flexible flaps 21 is a channel section member 31. Adjacent flexible flaps are connected together by plates 32 which are fixed, to the channel section members 31 and which also engage slots 33 in a crosshead 34 supported on the interdigited relatively rigid flaps.

In operation a recirculating ball jack 35 moves the crosshead 34 axially which, by virtue of the inclination of the slots 33, changes the distance between the side edges of adjacent flaps and causes them to pivot about their respective upstream ends. At the same time the crosshead 34 engages a channel 37 in the relatively rigid flap 21 and causes the relatively rigid flap to pivot about its upstream end. Gas pressure within the nozzle causes the curvature of the flexible flaps to change so that the gas pressure forces acting on the flaps trying to force them to pivot outwardly about their upstream ends are born in hoop tension, the "hoop" passing from one flexible flap to the next adjacent flexible flap via the plates 32 and the crosshead 34.

Turning now to FIG. 3, which shows an axial view of the nozzle 19 looking in the upstream direction, it can be seen that each crosshead operating mechanism is housed in a respective fairing 40 which is of small radial depth and circumferential extent. The small cross sectional area of each fairing accounts for the relatively light weight and low base drag attributable to the present nozzle configuration.

In FIG. 4 which is a section on the line IV—IV of FIG. 3 a detail view of each crosshead operating mechanism 34 and the respective fairing 40 can be seen. The relatively rigid flap 22 is of sufficient circumferential extent to enclose the channel section members 31 of adjacent flexible flaps 21 and co-operates with a seal 41 on each channel section member to prevent the leakage of pressurized fluid between the flexible and rigid flaps. The crosshead 34 has a radially inwardly protruding flange 42 which carries on a pivot 43 two rollers 44, 45 which run in the channel 37 in the relatively rigid flap 22. The fairing 40 is connected to the crosshead for movement relative thereto by a dovetail 46 engaged in a "T" shaped slot 47. The plates 32 can be seen bolted through the channel section members and supporting rollers 48 for engaging respective slots 33 in the crosshead.

A particular advantage of this nozzle construction is that it readily permits the use of a reheat liner 51. The reheat liner comprises four portions 52, one fixed to each rigid flap 22 for movement together therewith, and four portions 53, one supported in each slot 54 between each rigid flap 22 and the respective flexible flap 21.

In FIG. 5 is shown a similar section to that in FIG. 4 but with the nozzle contracted to the minimum area position. The crosshead 34 has been ommitted from this figure. It will be seen from FIG. 5 that the reheat liner portions 53 have moved together with the flexible flaps 21 and that their side edges 56 are accommodated within the space 57 between each respective rigid flap and channel section member.

Referring now to FIG. 6 an alternative arrangement is shown for operating the crossheads 34. Instead of the flexible and rigid flaps 21, 22 respectively being pivoted at their upstream ends to the jet pipe they are now pivoted to an axially translatable ring 58. Each crosshead is mounted by a fixed spar 59 to a second ring 60 fixed relative to the jet pipe 26. The recirculating ball screw jacks 35 are connected at one end to the fixed ring 60 for axially translating the ring 58 to vary the nozzle exit area from A1 to A2.

The ends 61 of the spars 59 are pivotally connected to the fixed ring 60 to accommodate the radially outward movement of the crossheads 34 that occurs as the nozzle exit area is varied.

It will be seen that this alternative arrangement is suitable for use with a reheat liner 62 arranged within a fixed convergent duct 63 at the end of the jet pipe 26 to vary the nozzle geometry from a convergent to a convergent-divergent configuration, with a throat at the discharge opening 64 of the liner 62.

It has been found that there should preferably be four flexible flaps for the most advantageous nozzle design. However it is possible to construct a workable nozzle with three flexible flaps or with more than four flexible flaps. The use of four flexible flaps is particularly advantageous for the side by side installation of two engines as shown in FIGS. 1 and 7.

The base area 65 between the two nozzles 19 and 20, as shown in dotted lines in FIG. 7, can be seen to be very small. This small base area is possible because the nozzles can be placed substantially together by suitably positioning the fairings 40.

In the above described nozzle constructions it will be seen that all the nozzle operating linkage is shielded from the hot gases passing through the jet pipe by either a reheat liner or other fixed structure. This shielding has the advantage that the nozzle operating mechanism can be kept sufficiently cool that it can be made from a relatively lightweight material such as titanium.

Turning now to FIG. 8 a modification of the nozzle of FIG. 6 is shown which is particularly adapted for use as a convergent-divergent nozzle. The modification is achieved by extending the axial length of the rigid flaps 22 beyond the length of the flexible flaps 21 and flaring the flap extensions 66 radially outwardly.

Downstream of each flexible flap 21 and between adjacent rigid flap extensions 66 there is provided a further pair of outwardly flared flaps 67, 68 which are connected via respective box section beams 69, 70 to the ring 61. The beams 69, 70 overlie the relatively flexible flaps and are pivotally connected to the ring 61 by pivots 71 in similar fashion to the relatively rigid and relatively flexible flaps. This can be seen by referring also to FIG. 11.

A pair of rollers 72, 73 is attached to each beam 69, 70 at about its mid point and the rollers bear on the radially inner side of respective arcuate tracks 74. In operation, gas pressure acting on the flaps 67, 68 and maintaining the rollers 72, 73 in contact with each respective track, and translation of the ring 61 causes a radially outward movement of the flaps 67, 68 from the convergent position 75 to the convergent-divergent position shown in dotted lines at 76. The curvature of the tracks 74 is chosen so that movement of the flaps 67, 68 corresponds with the movement imposed on the flap extensions 66 by the flexible nozzle flap arrangement. This allows the edge portions of adjacent flap extensions 66 and flared flaps 67, 68 to be interdigitated as shown in FIG. 9. In FIG. 9 it can be seen that the edges 76, 77 of the flap extensions 66 sit underneath the respective edges 78, 79 of adjacent flared flaps 67, 68 and that the edges 80 of flared flap 67 sit underneath the corresponding edges 81 of the adjacent flared flaps 68.

Surrounding the nozzle structure there is provided a circumferential array of interdigitated nozzle fairing flaps 82 which extend in known manner from fixed engine (or aircraft) structure 83 upstream of the nozzle to bear on the nozzle at its downstream end at 84. The faring flaps enclose all the operating mechanism for the nozzle and converge at the so called optimum boat tail angle for the avoidance of base drag.

The arcuate tracks 74 are connected, as can be seen from FIG. 10, at their upstream and downstream ends by a polygonal structure 84 which allows the radially outward load imposed on the tracks via the rollers 72, 73 to be borne in hoop tension in the polygonal structure.

Sealing of the downstream end of the nozzle between the flap extensions 66 and the flared flaps 67, 68 is readily achieved because of the line contact between adjacent flaps and leakage in this area is not in any case critical. The lack of criticality arises because a plot of jet pipe pressure against axial position along the jet pipe shows that for a convergent-divergent nozzle there is a considerable pressure reduction in this region.

In a further modification the relatively rigid flaps, the relatively flexible flaps and the flared flaps 67, 68 are all pivoted to a fixed ring at the end of the jet pipe and variation of the nozzle geometry is achieved as described with reference to FIGS. 1–5. For this modification it is necessary to provide also means for translating the arcuate guide tracks 74 to produce the necessary movement of the flared flaps 67, 68. Movement of the guide tracks can be achieved by connecting them to the crossheads for movement together therewith.

I claim:

1. A gas turbine engine having a nozzle wherein a plurality of flaps are pivotable about their upstream ends and cooperate to vary the geometry of the nozzle the flaps comprising at least three relatively flexible flaps forming the greater part of the nozzle circumference and interdigitated with relatively rigid flaps, the axially extending free side edges of respective adjacent relatively flexible flaps being connected together by means for producing relatively circumferential movement between said free side edges of the flexible flaps and the relatively rigid flaps whereby all of the flaps pivot about their upstream ends and the flexible flaps are caused to change their curvature so that the geometry of the nozzle is varied, said means for producing relative circumferential movement being capable of taking the hoop tension in said flexible flaps.

2. A gas turbine engine according to claim 1 and wherein the means for producing relative circumferential movement includes means for pivotally moving the relatively rigid flaps together with the relatively flexible flaps.

3. A gas turbine engine according to claim 1 and in which the means for producing relative circumferential movement comprises a crosshead having a pair of inclined slots which are cooperable with rollers connected to the relatively flexible flaps and engaging the said slots on relative movement of the crosshead and flaps.

4. A gas turbine engine according to claim 1 and in which the upstream ends of the flaps are pivoted to a ring, surrounding the engine and in which there is further provided means for axially translating the ring relative to the engine.

5. A gas turbine engine according to claim 3 in which the upstream ends of the flaps are pivoted to a ring, surrounding the engine and in which there is further provided means for axially translating the ring relative to the engine.

6. A gas turbine engine according to claim 5 and in which said relative movement between the crossheads and the flaps is produced by means of a spar connecting the crosshead to fixed structure upstream of the nozzle.

7. A gas turbine engine according to claim 1 and in which there is provided a heat shield disposed radially inwardly of the flaps.

8. A gas turbine engine according to claim 4 and in which there is provided a fixed conical heat shield disposed radially inwardly of the flaps, said heat shield terminating in a discharge orifice upstream of the downstream ends of the flaps and being co-operable over one range of axial positions of the ring and flaps to define a convergent nozzle and, in a further range, the discharge orifice forming a throat that co-operates with the flaps to define a convergent divergent nozzle.

9. A gas turbine engine according to claim 1 in which there are provided four relatively rigid flaps.

10. A gas turbine engine according to claim 1 and wherein there is provided in respect of each relatively rigid flap an axially extending radially outwardly flared extension connected to the rigid flap, and, in respect of each relatively flexible flap, at least one radially outwardly flared flap portion disposed downstream of the end of the flexible flap, and supported by a respective beam overlying the flexible flap, the outwardly flared extensions and the outwardly flared flap portions being interdigitated and there being provided means for controlling the radially outward pivotal movement of the outwardly flared flap portions to correspond with radial outward pivotal movement of the relatively rigid flap on operation of the nozzle.

11. A gas turbine engine according to claim 10 and in which there is provided means for pivotally connecting the relatively rigid flaps, the relatively flexible flaps and the beams supporting the outwardly flared flap portions to a ring surrounding the engine and means for axially moving the ring relative to the engine, and wherein axial movement of the ring initiates the means for producing relative circumferential movement to vary the geometry of the nozzle.

12. A gas turbine engine according to claim 11 in which the means for controlling the radially outward pivotal movement of the outwardly flared flap portions comprises a pair of rollers disposed one on either side of each beam each roller running on the radially inner surface of a guide track and the guide tracks being interconnected by a circumferentially extending member whereby radially outward loads applied to the guide tracks from the rollers are borne in tension in the circumferentially extending members.

13. A gas turbine engine according to claim 10 and in which there is provided two outwardly flared flap portions downstream of each relatively flexible flap.

14. A gas turbine engine according to claim 10 in which there is further provided interdigitated faring flaps as known per se and disposed radially outwardly of the nozzle to blend the nozzle to structure upstream thereof.

15. A gas turbine engine having a nozzle wherein a plurality of flaps are pivotable about their upstream ends and cooperate to vary the geometry of the nozzle and flaps comprising at least three relatively flexible flaps interdigitated with relatively rigid flaps, the axially extending free side edges of respective adjacent relatively flexible flaps being connected together by means for varying the distance between said free side edges whereby all of the flaps pivot about their upstream ends and the flexible flaps are caused to change their curvature so that the geometry of the nozzle is varied, wherein the upstream ends of the flaps are pivoted to a ring, surrounding the engine and in which there is further means for axially translating the ring relative to the engine, and wherein a fixed conical heat shield is disposed radially inwardly of the flaps, said heat shield terminating in a discharge orifice upstream of the downstream ends of the flaps and being co-operable over one range of axial positions of the ring and flaps for defining a convergent nozzle and, in a further range, the discharge orifice forming a throat that co-operates with the flaps to define a convergent divergent nozzle.

* * * * *